(12) United States Patent
Bagchi

(10) Patent No.: US 10,648,823 B2
(45) Date of Patent: *May 12, 2020

(54) LEARNING COMMON ROUTES AND AUTOMATIC GEOFENCING IN FLEET MANAGEMENT

(71) Applicant: Aeris Communications, Inc., San Jose, CA (US)

(72) Inventor: Anupam Bagchi, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,061

(22) Filed: May 3, 2018

(65) Prior Publication Data

US 2018/0372503 A1    Dec. 27, 2018

Related U.S. Application Data

(60) Provisional application No. 62/523,748, filed on Jun. 22, 2017.

(51) Int. Cl.
*G01C 21/34*     (2006.01)
*G06Q 10/04*    (2012.01)
(Continued)

(52) U.S. Cl.
CPC ....... *G01C 21/343* (2013.01); *G01C 21/3484* (2013.01); *G01C 21/3492* (2013.01);
(Continued)

(58) Field of Classification Search
CPC ......... H04L 67/12; H04L 67/02; H04L 67/10; H04L 67/18; H04L 67/22; H04W 4/021;
(Continued)

(56) References Cited

U.S. PATENT DOCUMENTS 3,510,200 A    5/1970 Pearlman
6,239,707 B1   5/2001 Park
(Continued)

FOREIGN PATENT DOCUMENTS

CN    104835029    8/2015
WO    2014106299   7/2014
(Continued)

OTHER PUBLICATIONS

Wei-Tek Tsai et al., "Service-Oriented Cloud Computing Architecture," 2010 [retrieved on May 19, 2019], Seventh International Conference on Information Technology: New Generations, pp. 684-689, downloaded from: https://ieeexplore.ieee.org/. 2010.
(Continued)

*Primary Examiner* — Babar Sarwar
(74) *Attorney, Agent, or Firm* — Brundidge & Stanger, P.C.

(57) ABSTRACT

A computer-implemented method and system for providing a geo-fence are disclosed.
The method for providing a geo-fence includes collecting and storing route information for one or more mobile devices; analyzing the route information for the one or more mobile devices to determine optimum route; and creating the geo-fence around a route to be monitored based on the route information for the optimum route.
The system for providing a geo-fence includes one or more mobile devices, a user interface and a data processing system. The data processing system includes a learning database, wherein the learning database collects and stores route information for the one or more mobile device; and an analytics engine, wherein the analytics engine analyzes the route information to determine optimum route, and create the geo-fence around a route to be monitored based on the route information for the optimum route.

18 Claims, 8 Drawing Sheets

(51) Int. Cl.
*H04W 4/021* (2018.01)
*G01C 21/36* (2006.01)
*G06F 16/9537* (2019.01)
*G06N 20/00* (2019.01)
*G06F 16/951* (2019.01)
*H04L 29/08* (2006.01)
*H04W 4/02* (2018.01)
*H04W 64/00* (2009.01)
*G06N 5/04* (2006.01)

(52) U.S. Cl.
CPC ....... *G01C 21/3676* (2013.01); *G06F 16/951* (2019.01); *G06F 16/9537* (2019.01); *G06N 20/00* (2019.01); *G06Q 10/047* (2013.01); *H04L 67/12* (2013.01); *H04W 4/021* (2013.01); *H04W 4/023* (2013.01); *H04W 64/00* (2013.01); *G06N 5/04* (2013.01)

(58) Field of Classification Search
CPC ....... H04W 4/023; H04W 4/70; H04W 4/029; H04W 4/40; H04W 4/44; H04W 64/00; G01C 21/343; G01C 21/3484; G01C 21/3492; G01C 21/3676; G06F 16/951; G06F 16/9537; G06N 20/00; G06N 5/04; G06Q 10/047; G06Q 10/063114; G07C 5/008
See application file for complete search history.

(56) References Cited

U.S. PATENT DOCUMENTS

| | | | |
|---|---|---|---|
| 6,496,775 B2 | 12/2002 | McDonald, Jr. | |
| 6,651,001 B2 | 11/2003 | Apsell | |
| 6,687,356 B1* | 2/2004 | Glitho | H04L 12/6418 370/215 |
| 6,931,309 B2 | 8/2005 | Phelan | |
| 7,213,048 B1* | 5/2007 | Parupudi | H04L 29/12169 709/203 |
| 7,246,009 B2 | 7/2007 | Hamblen | |
| 7,801,538 B2 | 9/2010 | Weiser | |
| 7,848,765 B2 | 12/2010 | Phillips | |
| 8,000,726 B2 | 8/2011 | Altman | |
| 8,018,329 B2 | 9/2011 | Morgan | |
| 8,135,505 B2* | 3/2012 | Vengroff | G06Q 30/02 701/24 |
| 8,346,230 B2 | 1/2013 | Goodman | |
| 8,473,148 B2 | 6/2013 | Nielsen | |
| 8,566,014 B1 | 10/2013 | Kozolchyk | |
| 8,589,330 B2 | 11/2013 | Petersen | |
| 8,593,277 B2 | 11/2013 | Nath | |
| 8,595,696 B2 | 11/2013 | Maximilien et al. | |
| 8,630,768 B2 | 1/2014 | McClellan | |
| 8,667,456 B1 | 3/2014 | Czymontek | |
| 8,725,569 B2* | 5/2014 | Liang | G06Q 30/0255 705/14.66 |
| 8,755,824 B1 | 6/2014 | Wang | |
| 8,756,010 B2 | 6/2014 | Gupta | |
| 8,869,038 B2 | 10/2014 | Eick | |
| 8,909,256 B2 | 12/2014 | Fraccaroli | |
| 8,913,983 B2 | 12/2014 | Lorello | |
| 8,949,022 B1 | 2/2015 | Fahrner | |
| 8,971,930 B2* | 3/2015 | Li | H04L 67/40 455/414.1 |
| 9,014,888 B2 | 4/2015 | Sukkarié | |
| 9,043,222 B1* | 5/2015 | Kerr | G06Q 30/0621 705/14.58 |
| 9,076,009 B2 | 7/2015 | Sathish | |
| 9,076,165 B2 | 7/2015 | Busch | |
| 9,104,738 B2 | 8/2015 | Kay et al. | |
| 9,119,038 B2 | 8/2015 | Woods | |
| 9,122,693 B2 | 9/2015 | Blom | |
| 9,140,567 B2 | 9/2015 | Fryer | |
| 9,141,266 B2 | 9/2015 | McCormick | |
| 9,146,721 B1 | 9/2015 | Nagaraja | |
| 9,210,534 B1 | 12/2015 | Matthieu | |
| 9,225,519 B1* | 12/2015 | Fraccaroli | G06F 16/381 |
| 9,250,887 B2 | 2/2016 | Lucovsky | |
| 9,275,114 B2 | 3/2016 | Milton | |
| 9,277,362 B2 | 3/2016 | Li | |
| 9,349,128 B1 | 5/2016 | Kerr | |
| 9,424,751 B2 | 8/2016 | Hodges | |
| 9,507,346 B1 | 11/2016 | Levinson | |
| 9,576,295 B2 | 2/2017 | Volpe | |
| 9,615,202 B2 | 4/2017 | Dal Santo | |
| 9,661,470 B1 | 5/2017 | Du Bois | |
| 9,712,486 B2 | 7/2017 | Johnson | |
| 9,712,972 B2 | 7/2017 | Lynch | |
| 9,741,191 B1 | 8/2017 | Wong | |
| 9,774,994 B2* | 9/2017 | Chen | H04W 4/021 |
| 9,792,567 B2 | 10/2017 | Khasis | |
| 9,805,521 B1 | 10/2017 | Davidson | |
| 9,817,948 B2 | 11/2017 | Swank | |
| 9,826,345 B2 | 11/2017 | Haro | |
| 9,838,843 B1 | 12/2017 | Bajaj | |
| 9,871,865 B2 | 1/2018 | Shaashua | |
| 9,878,663 B1 | 1/2018 | Kochura | |
| 9,988,058 B2* | 6/2018 | Phillips | G07C 5/0808 |
| 10,037,668 B1 | 7/2018 | DesGarennes et al. | |
| 10,097,960 B2 | 10/2018 | Tung | |
| 10,231,084 B2* | 3/2019 | Bagchi | H04W 4/70 |
| 2004/0111195 A1* | 6/2004 | Vries | B63B 49/00 701/21 |
| 2004/0193617 A1 | 9/2004 | Adler | |
| 2005/0090978 A1* | 4/2005 | Bathory | G08G 5/0013 701/469 |
| 2005/0096009 A1* | 5/2005 | Ackley | H04M 1/663 455/405 |
| 2005/0156715 A1* | 7/2005 | Zou | B60R 25/1025 340/426.19 |
| 2006/0248121 A1 | 11/2006 | Cacenco et al. | |
| 2007/0143013 A1 | 6/2007 | Breen | |
| 2007/0173991 A1* | 7/2007 | Tenzer | G07C 5/008 701/31.4 |
| 2008/0033791 A1 | 2/2008 | Jones | |
| 2008/0125965 A1 | 5/2008 | Carani | |
| 2008/0319602 A1* | 12/2008 | McClellan | G07C 5/008 701/31.4 |
| 2009/0009321 A1* | 1/2009 | McClellan | G08G 1/207 340/539.13 |
| 2009/0079555 A1 | 3/2009 | Aguirre De Carcer | |
| 2009/0248883 A1* | 10/2009 | Suryanarayana | G06F 9/451 709/229 |
| 2009/0019357 A1 | 11/2009 | Cudich | |
| 2009/0275348 A1* | 11/2009 | Weinreich | G01S 5/0036 455/456.3 |
| 2009/0309789 A1* | 12/2009 | Verechtchiagine | G01S 19/42 342/357.33 |
| 2009/0326991 A1* | 12/2009 | Wei | G06Q 10/02 705/5 |
| 2010/0075648 A1* | 3/2010 | Matsuoka | H04M 1/72566 455/418 |
| 2010/0094500 A1* | 4/2010 | Jin | G01C 21/26 701/31.4 |
| 2010/0106603 A1* | 4/2010 | Dey | G01C 21/3484 705/14.63 |
| 2010/0203901 A1* | 8/2010 | Dinoff | H04W 4/022 455/456.3 |
| 2010/0214068 A1* | 8/2010 | Nadkarni | G01S 5/22 340/10.1 |
| 2010/0280734 A1* | 11/2010 | Brinton | G08G 1/096805 701/101 |
| 2010/0289644 A1 | 11/2010 | Slavin | |
| 2010/0306735 A1 | 12/2010 | Hoff et al. | |
| 2011/0112768 A1* | 5/2011 | Doyle | G06Q 10/08 701/300 |
| 2011/0126168 A1 | 5/2011 | Ilyayev | |
| 2011/0178811 A1 | 7/2011 | Sheridan | |
| 2011/0202591 A1 | 8/2011 | Reis | |
| 2011/0238457 A1* | 9/2011 | Mason | G01C 21/3469 705/7.14 |

(56) References Cited

U.S. PATENT DOCUMENTS

| | | | |
|---|---|---|---|
| 2012/0058764 A1* | 3/2012 | Kang | H04W 60/02 455/435.1 |
| 2012/0260228 A1 | 10/2012 | Mallick | |
| 2012/0330722 A1 | 12/2012 | Volpe et al. | |
| 2013/0031029 A1* | 1/2013 | Davidson | G07B 15/06 705/412 |
| 2013/0055253 A1 | 2/2013 | Jubran | |
| 2013/0066688 A1 | 3/2013 | Pinkus | |
| 2013/0090106 A1* | 4/2013 | Mathews | H04W 4/06 455/418 |
| 2013/0093603 A1 | 4/2013 | Tschirhart | |
| 2013/0103307 A1* | 4/2013 | Sartipi | H04W 4/021 701/465 |
| 2013/0141249 A1 | 6/2013 | Pearlman et al. | |
| 2013/0190967 A1* | 7/2013 | Hassib | G06Q 10/00 701/31.5 |
| 2013/0212130 A1* | 8/2013 | Rahnama | H04W 4/021 707/792 |
| 2013/0245880 A1* | 9/2013 | McQuade | G07C 5/008 701/32.4 |
| 2013/0254755 A1 | 9/2013 | Yousouf | |
| 2013/0267253 A1 | 10/2013 | Case | |
| 2013/0289819 A1* | 10/2013 | Hassib | G06F 17/00 701/29.6 |
| 2013/0289873 A1 | 10/2013 | Mitchell | |
| 2013/0297803 A1 | 11/2013 | Hate | |
| 2013/0304347 A1* | 11/2013 | Davidson | G06Q 10/083 701/99 |
| 2013/0340305 A1* | 12/2013 | Mobley | A01K 29/005 40/300 |
| 2013/0346336 A1 | 12/2013 | Murphy | |
| 2014/0026113 A1 | 1/2014 | Farooqi | |
| 2014/0057648 A1 | 2/2014 | Lyman | |
| 2014/0059695 A1 | 2/2014 | Parecki | |
| 2014/0062695 A1* | 3/2014 | Rosen | G08B 21/18 340/539.13 |
| 2014/0095214 A1 | 4/2014 | Mathe et al. | |
| 2014/0155094 A1 | 6/2014 | Zises | |
| 2014/0172294 A1* | 6/2014 | Kalra | G01C 21/3484 701/465 |
| 2014/0215043 A1 | 7/2014 | Ryu et al. | |
| 2014/0226470 A1 | 8/2014 | Kim | |
| 2014/0274115 A1* | 9/2014 | Michalson | H04W 4/029 455/456.1 |
| 2014/0274136 A1* | 9/2014 | Edge | H04W 4/029 455/456.2 |
| 2014/0282380 A1 | 9/2014 | Abrahams | |
| 2014/0325048 A1 | 10/2014 | Benchorin | |
| 2014/0325394 A1 | 10/2014 | Hamill | |
| 2014/0351411 A1 | 11/2014 | Woods | |
| 2014/0359552 A1 | 12/2014 | Misra | |
| 2014/0370911 A1* | 12/2014 | Gorgenyi | H04W 4/021 455/456.1 |
| 2014/0380264 A1 | 12/2014 | Misra et al. | |
| 2015/0012908 A1* | 1/2015 | Farooqi | G06F 8/34 717/107 |
| 2015/0095355 A1 | 4/2015 | Patton | |
| 2015/0106206 A1 | 4/2015 | Vengroff | |
| 2015/0135163 A1 | 5/2015 | Mun | |
| 2015/0149980 A1 | 5/2015 | Zhong | |
| 2015/0163626 A1* | 6/2015 | Zimmer | H04W 4/029 455/404.2 |
| 2015/0163630 A1* | 6/2015 | Hughes, Jr. | H04W 4/021 455/456.3 |
| 2015/0173037 A1 | 6/2015 | Pijl | |
| 2015/0180746 A1* | 6/2015 | Day, II | H04L 51/16 455/405 |
| 2015/0181016 A1 | 6/2015 | Jain | |
| 2015/0245189 A1 | 8/2015 | Nalluri | |
| 2015/0264527 A1 | 9/2015 | Wang | |
| 2015/0271033 A1 | 9/2015 | Srivastava et al. | |
| 2015/0278759 A1 | 10/2015 | Harris | |
| 2015/0304175 A1 | 10/2015 | Maes | |
| 2015/0350843 A1 | 12/2015 | Jensen et al. | |
| 2016/0003627 A1* | 1/2016 | Bonhomme | H04W 4/029 701/400 |
| 2016/0041833 A1 | 2/2016 | Standley et al. | |
| 2016/0042303 A1* | 2/2016 | Medina | G01C 21/3438 705/5 |
| 2016/0050536 A1 | 2/2016 | You | |
| 2016/0057209 A1 | 2/2016 | Parikh | |
| 2016/0066141 A1* | 3/2016 | Jain | H04W 4/021 455/456.1 |
| 2016/0071333 A1* | 3/2016 | Haidar | G07C 5/006 701/29.3 |
| 2016/0073229 A1 | 3/2016 | Haro | |
| 2016/0086397 A1* | 3/2016 | Phillips | G07C 5/0808 701/32.4 |
| 2016/0103657 A1 | 4/2016 | Zhang et al. | |
| 2016/0116596 A1* | 4/2016 | Rajala | G08B 25/10 342/357.54 |
| 2016/0124742 A1 | 5/2016 | Rangasamy | |
| 2016/0150021 A1 | 5/2016 | Britt | |
| 2016/0173404 A1 | 6/2016 | Pouyllau | |
| 2016/0203651 A1* | 7/2016 | Heath | G06Q 50/30 705/13 |
| 2016/0247330 A1* | 8/2016 | Rork | H04W 4/021 |
| 2016/0284184 A1 | 9/2016 | Bean et al. | |
| 2016/0286355 A1* | 9/2016 | Shur | H04W 4/029 |
| 2016/0357522 A1 | 12/2016 | Wee | |
| 2016/0371553 A1 | 12/2016 | Farnham, IV | |
| 2017/0006135 A1 | 1/2017 | Siebel | |
| 2017/0006419 A1* | 1/2017 | Rajala | H04W 4/021 |
| 2017/0006430 A1 | 1/2017 | Chao | |
| 2017/0048669 A1* | 2/2017 | Chen | H04W 4/021 |
| 2017/0171204 A1 | 6/2017 | Forood | |
| 2017/0203633 A1 | 7/2017 | High | |
| 2017/0244841 A1* | 8/2017 | Costandi | H04M 11/007 |
| 2017/0270792 A1 | 9/2017 | Breton | |
| 2017/0349058 A1 | 12/2017 | Bernier | |
| 2017/0359237 A1 | 12/2017 | Hao | |
| 2017/0366933 A1* | 12/2017 | Chen | H04W 4/021 |
| 2018/0005522 A1 | 1/2018 | Pogula | |
| 2018/0049001 A1 | 2/2018 | Volozh | |
| 2018/0199239 A1 | 7/2018 | Sabater Maroto | |
| 2018/0255428 A1* | 9/2018 | Bagchi | H04W 4/70 |
| 2018/0302476 A1 | 10/2018 | Perez | |
| 2018/0365785 A1 | 12/2018 | Boss | |
| 2018/0372503 A1 | 12/2018 | Bagchi | G06N 20/00 |
| 2019/0266518 A1* | 8/2019 | Medina | G06Q 10/02 |
| 2019/0285426 A1 | 9/2019 | Mitchell | |

FOREIGN PATENT DOCUMENTS

| | | |
|---|---|---|
| WO | 2015143416 | 9/2015 |
| WO | 2016025495 | 2/2016 |

OTHER PUBLICATIONS

B Loganayagi et al., "Creating Virtual Platform for Cloud Computing,"2010 [retrieved on May 9, 2019], 2010 IEEE International Conference on Computational Intelligence and Computing Research, pp. 1-4, downloaded from: https://ieeexplore.ieee.org 2010.

Radha Guha et al, "Impact of Web 2.0 and Cloud Computing Platform on Software Engineering,"2011 [retrieved on May 9, 2019], International Symposium on Electronic System Design, pp. 213-218, downloaded from:https//ieeexplore.ieee.org 2011.

International Search Report and Written Opinion from International Application No. PCT/US16/46924 dated Oct. 28, 2016.

"GeoFencing & Alerts", myGeoTracking, Abaqus Inc., Jul. 11, 2016, 1 page, Retrieved from: http://www.mygeotracking.com/solutions/pdf/geo_fencing_alerts.pdf.

International Search Report and Written Opinion from International Application No. PCT/US16/46923 dated Oct. 27, 2016.

Wikipedia, "Virtual Machine,"2014, pp. 1-9, downloaded from the Wayback Machine Internet Archive at ,<url>:https://web.archive.org/web/20140402003043/https://en.wikipedia.org/wik/Virtual_machine.

(56) References Cited

OTHER PUBLICATIONS

Wikipedia, "Virtual Machine,"2013, pp. 1-11, downloaded from the Wayback Machine Internet Archive at <url>:https://web.archive.org/web/20130402165412/https://en.wikipedia.org/wiki/Wireless_sensor_network.
Brouwers et al., Dwelling in the canyons: Dwelling detection in Urban Environments Using GPS, Wi-Fi, and Geolocation, Dec. 14, 2011.
Boukhechba et al.,Hybrid battery-friendly mobile solution for extracting users' visited places, Dec. 31, 2016.
Perera et al., Energy Efficient Location and Activity-aware On-Demand Mobile Distributed Sensing Platform for Sensing as a Service in IoT Clouds, http://arxiv.org/abs/1601.00428, Apr. 1, 2016.
Merlino et al., Mobile crowdsensing as a service: A platform for applications on top of sensing Clouds, http://www.sciencedirect.com/science/article/pii/S0167739X15002976, Mar. 2016.
Wikipedia, "Virtual Machine,"2014, pp. 1-9, downloaded from the Wayback Machine Internet Archive at ,<url>:https://web.archive.org/web/20140402003043/https://en.wikipedia.org/wiki/Virtual_machine.
Almomani et al., "Ubiquitous GPS vehicle tracking and management system", In Applied Electrical Engineering and Computing Technologies (AEECT), Dec. 31, 2011, IEEE Jordan Conference on, pp. 1-6.
Dennis Mbuvi, "Airtel Provide Connectivity to 2nk Sacco's Frotcom Fleet Management System", Airtel, Africa News Service, Feb. 2013.
Gerla et al., "Internet of vehicles: From intelligent grid to autonomous cars and vehicular clouds", In Internet of Things (WF-IoT), 2014 IEEE World Forum on, pp. 241-246, Dec. 31, 2014.
Rusu et al., "Localization in large-scale underground environments with RFID", 24th Canadian Conference on Electrical and Computer Engineering (CCECE), May 31, 2011.
Jin et al., "An information framework for creating a smart city through internet of things", IEEE Internet of Things Journal, 1(2), pp. 112-121, Dec. 31, 2014.
Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.
Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/DESIGN%20AND%20CONSTRUCTION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.
AT&T, Fleet management and tracking, Feb. 26, 2018., Retrieved from the Internet: https://www.business.att.com/solutions/Service/internet-of-things/vehicle-solutions/iot-connected-fleet/. (C)2018. Earliest publication date via Wayback archive:http://web.archive.org/web/20180226093503/https://www.business.att.com/solutions/Service/internet-of-things/vehicle-solutions/iot-connected-fleet/.
Frey, IoT ushers in a new era for supply chain fulfillment, Oct. 25, 2017, Retrieved from the Internet: https://internetofthingsagenda.techtarget.com/blog/IoT-Agenda/IoT-ushers-in-a-new-era-for-supply-chain-fulfillment.
International Search Report and Written Opinion from International Application No. PCTUS1838825 dated Sep. 18, 2018.

\* cited by examiner

Discovered route with a geo-fence polygon around it.

400

A set of routes between two locations, and a suggestion of the most optimal route with a calculated geo-fence around it

LEARNING COMMON ROUTES AND AUTOMATIC GEOFENCING IN FLEET MANAGEMENT

CROSS-REFERENCE TO RELATED APPLICATION

This application claims priority to U.S. Provisional Application No. 62/523,748, filed Jun. 22, 2017, entitled "LEARNING LOCATIONS OF INTEREST USING IoT DEVICES" which is incorporated herein by reference in its entirety.

FIELD OF THE INVENTION

The embodiments described herein relate generally to providing a system and method for monitoring devices and more particularly to learning common routes and providing a geo-fence around a route for IoT devices.

BACKGROUND

In many Internet-of-Things (IoT)/Machine-to-Machine (M2M) solutions, particularly running on moving machines, for example, vehicles, it may be useful to the fleet operator to learn routes taken by the moving machines as they go around town or the country-side completing their assignments.

SUMMARY

In one example embodiment, a computer-implemented method for providing a geo-fence around a route is disclosed. The method includes collecting and storing route information for one or more mobile devices; analyzing the route information for the one or more mobile devices to determine optimum route; and creating the geo-fence around a route to be monitored based on the route information for the optimum route.

In another example embodiment, a system for providing a geo-fence around a route is disclosed. The system includes at least one mobile device, a data processing system and a user interface, wherein the data processing system further includes a learning database, wherein the learning database collects and stores route information for the one or more mobile device; and an analytics engine, wherein the analytics engine analyzes the route information of the one or more mobile devices to determine optimum route, and creates the geo-fence around a route to be monitored based on the route information for the optimum route.

In an embodiment, a non-transitory computer-readable medium is disclosed. The computer readable medium includes executable instructions stored therein that, when executed, cause one or more processors corresponding to a system for providing a geo-fence, the system including one or more mobile devices, a user interface and a data processing system having a learning database to perform operations including collecting and storing route information for one or more mobile devices by a learning database; analyzing the route information for the one or more mobile devices to determine optimum route, and creating the geo-fence around a route to be monitored based on the route information for the optimum route by the analytics engine.

DETAILED DESCRIPTION

Figure 1:
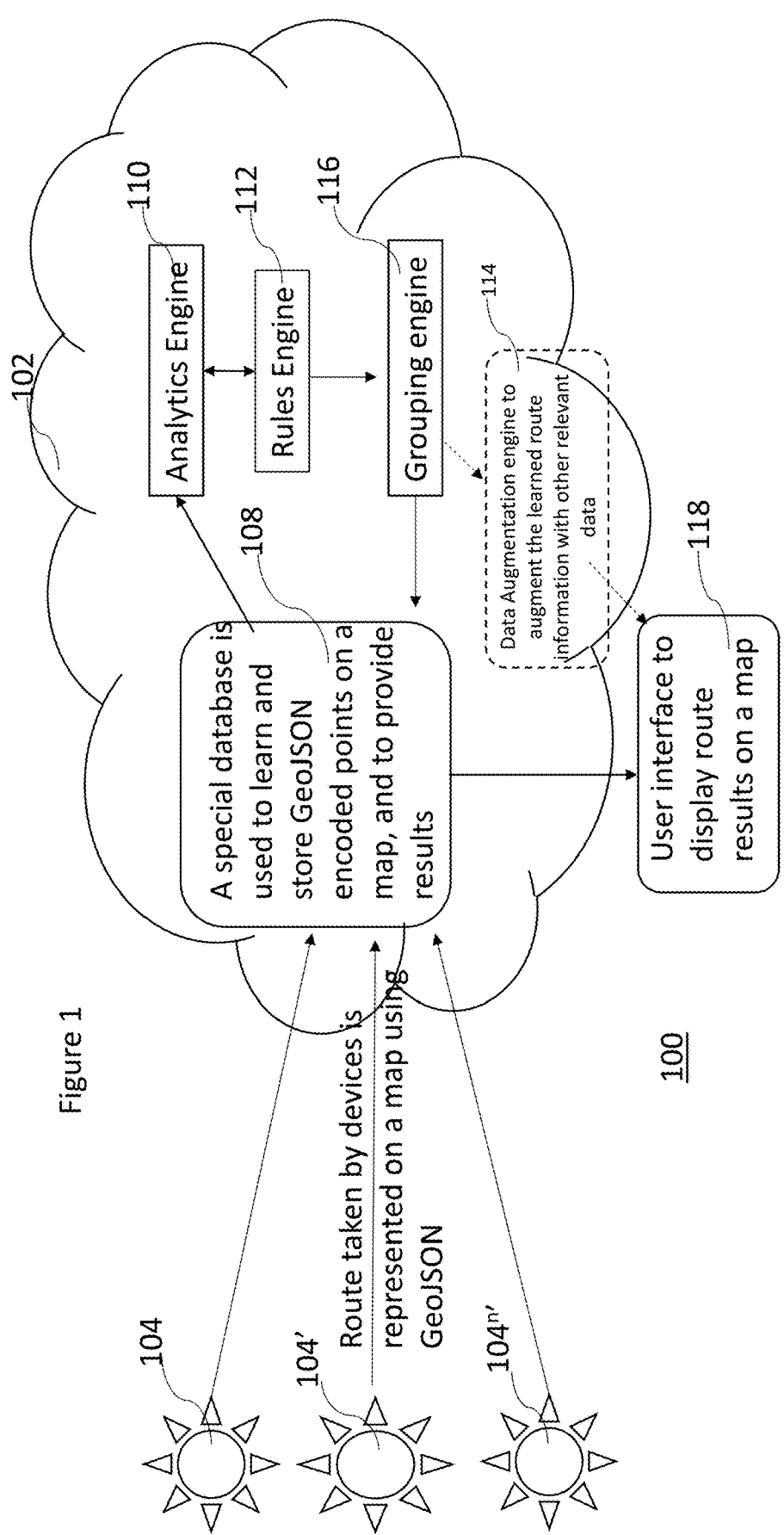
FIG. 1 is an overview diagram for the method and system for learning routes using IoT devices according to an embodiment described herein.

The embodiments described herein relate generally to wireless networks and more particularly to providing geo-fences by learning routes taken by IoT devices that are capable of moving, connected to the cellular network and sharing other characteristics (e.g., devices belonging to a commercial fleet of vehicles). The IoT devices have the ability to transmit data over a wireless communications network, such as wi-fi or cellular connectivity. The transmission may also be made to an intermediate device or system for re-transmission, for instance, through a bluetooth connection from the IoT device to a mobile phone which uses cellular connectivity. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown, but is to be accorded the widest scope consistent with the principles and features described herein.

In many Internet-of-Things (IoT)/Machine-to-Machine (M2M) solutions, particularly those running on moving machines, for example, commercial fleets of vehicles, it may be useful to the fleet operator to discover destinations that multiple users visit and routes that multiple users travel, based upon such criteria as matching starting and destination location and/or matching starting and arrival times. The uses of discovering common routes could include, for example, determining distance covered and time taken to complete the journey on a particular route at a particular time of day and ascertaining the optimal time for making that particular journey on that route. In a solution provided to an entity, e.g., a commercial fleet operator, it may be useful for the entity to discover destinations that multiple users visit and routes that multiple users travel and know if the drivers of the vehicles deviate from the expected route. This feature may be useful for the owner of the commercial fleet who may want to know if the driver is progressing on the designated route according to plan and/or to alert the driver if he/she deviates from the expected route.

The embodiments described herein pertain to automatic learning of common routes taken by commercial vehicles as they go around a defined geographic area, whether urban or not, completing their assignments. These routes are then ranked according to distance covered and time taken for the journey, and the optimal time and route for making that journey is ascertained depending on the time of day and day of week. Further, based on the optimal route, an automatic geo-fence around the route is created. The automatic geo-fence thus created may be used in applications that determine that a vehicle has started an assignment that involves a matching starting and destination location and alert the driver if he/she deviates from the expected route. This feature may also be useful to the owner of the commercial fleet who may want to know if the driver is progressing on the designated route according to plan. Although the application of this algorithm is explained as relating to commercial fleet, a person skilled in the art may easily understand that it is not limited to commercial fleets and may be used in other applications involving one or more moving machines, including repetitive trips by a single machine.

Drivers of a commercial fleet often go on routes that are similar, which may have common starting and ending points. Over a period of time this data may be collected and grouped to provide all routes taken by vehicles that started and ended at the same or similar location or within a predefined radius of proximity of a certain location. The data may also be sorted based on different parameters including but not limited to the time of day when the journey started, the day of week when the journey took place etc. Thus, over a period of time, the data regarding common routes taken by vehicles, the total travel time taken for each trip, and the day of week and starting time of trip may be collected and analyzed. It is therefore possible to rank the trips based on journey time for a set distance or the distance covered within a specific period of time. The best time of day and the least time taken for this trip is then be ascertained from the collected data.

This data can be used in the following manner. At the onset of a new journey from a known starting point, the driver could be presented, on a device allowing interaction, possible destination locations, ranked according to degree of confidence (e.g., number of routes started from that location at any time, or number of routes started from that or a nearby location at that time and date). The user would be able to choose one of the suggested destination locations in the graphical user interface. Once the destination location is selected, a lookup is done on the list of routes previously taken by vehicles moving between the same end-points, and the best one in terms of time and distance for a similar day of the week and starting time is chosen as the ideal route. Using an algorithm, an automatic polygon is created around the route with a pre-set margin of separation (e.g., allowing a deviation of up to 100 meters in any direction to allow navigating to avoid obstacles). This polygon is set as the geo-fence for this trip. If the vehicle moves outside this geo-fence polygon, an alert is sent to the driver and owner of the vehicle to warn them of a possible deviation from the allocated route.

There are several unique features of this invention. The embodiments described herein involve usage of a computer to determine proximity of an IoT device, which could be a mobile phone or a vehicle equipped with a means for determining location and transmitting data over wireless networks, to a known place among a vast number of such locations on a map. A special kind of encoding called GeoJSON is used to represent such points on a map and a special database is used to handle GeoJSON encoded points on a map. That same encoding can be used in combination with a computer that uses the known data set of map points associated with stored routes, including those labeled in or chosen by the program, using the criteria above, as optimal routes, to create a polygon whose sides rest along or within a defined variance of the chosen route; the polygon is then used by a location monitoring application that can send alerts if actual location of the vehicle strays outside the polygon boundaries. This coding and computer program allow both for very rapid association of specific points on a map with a likely set of matching points without needing to know or look up GPS coordinates, street address or the like, and for rapid and automated creation of "geofence" polygons, in each instance in a far more accurate and less laborious and time consuming manner than trying to make those same associations or to draw and input the geofence boundaries manually. The advantages provided by the embodiments described herein may be listed as follows: (a) it solves a very laborious and commonly occurring problem in the fleet industry, which is that of generating, in a real time, highly automated and low-error way, a tight geo-fence around the route, by employing a simple technique; (b) it provides a standard against which the fleet owner can compare the performance of drivers of his/her fleet; (c) it automatically builds a guideline of trip times between two locations that are commonly visited and provides an optimal time and route for making that journey; (d) the process is automated to improve itself over time as more and more trips are completed; (e) it presents a visual representation of the geo-fence to the operator and also indicates the location where the geo-fence alert was triggered; and (f) knowledge gained from common routes and trip times can be applied for optimizing delivery times, thus resulting in fuel and time savings.

The learning algorithm in the present invention allows learning to begin to be done in real-time or near real-time using a simple streaming API.

Serving the results in a Software-as-a-Service model requires storing the data in one database but with enough separation between co-existing accounts so that information about devices and behavior of devices belonging to one account is not presented to the owner of a different account. The algorithm in the present invention may process data gathered from devices belonging to multiple accounts together and store it together in a secure manner, which can assist with determining an optimal route for similar trips and setting the corresponding geo-fence, but present the data on a per-account basis that preserves confidentiality. Thus, data gathered from devices belonging to one account is not visible to any other account, however the data from different accounts may be used during the process to create more meaningful and useful results.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an overview diagram for the method and system for learning routes taken by IoT devices according to an embodiment described herein. The system 100 for providing a geo-fence includes one or more mobile devices 104, 104', 104''', a user interface 118 and a data processing system 102, wherein the data processing system 102 further includes a learning database 108, wherein the learning database 108 collects and stores route information for the one or more mobile devices 104, 104', 104'''; and an analytics engine 110, wherein the analytics engine 110 analyzes the route information of the one or more mobile devices 104, 104', 104'' to determine an optimum route, and creates the geo-fence around a route to be monitored based on the route information for the optimum route.

As described herein, the system 100 includes devices 104, 104', . . . 104''', a data processing system 102, including a learning or storage database 108, an analytics engine 110, a rules engine 112, clustering or grouping engine 116, and a user interface 118. Additionally, a data augmentation engine 114 may also be included to augment the learned route information with other relevant data, e.g., address.

The mobile devices 104, 104', . . . 104''' may include communication devices, for example, vehicles connected to the cellular network or cellular-enabled devices via SIMs that are installed in the communication devices either integrated in the vehicle itself or removably installed in the vehicle on each of the fleet vehicles. These communication devices may transmit relevant vehicle data, including identity of the device and/or location of the device, to storage database 108 and/or the data processing system 102 of the monitoring system using a wireless communication technology, for example, a radio module or WiFi etc. In an embodiment, the device data may also be received from network elements.

The system configuration 100 may include an instance of a client application with a user interface 118 hosted thereon, for example, a desktop fleet application provided through a web-based portal used by the fleet manager to manage fleet vehicles, and/or fleet application operating on mobile devices, such as smartphones, used by the fleet manager to manage fleet vehicles or by vehicle drivers to access the information on the go, anywhere, any time.

The learning or storage database 108 may be a special database which is used to learn and store GeoJSON encoded points on a map, including both starting and ending locations and points traveled along a route, and to analyze the data and provide results to users, such as, for example, through a service offered by a provider of asset tracking services using cloud computing. The data is gathered by the learning or storage database 108. For example, the system involves usage of a computer to determine proximity to a known place among a vast number of such locations on a map. A special kind of encoding called GeoJSON may be used to represent such points on a map. A special database may be used to handle GeoJSON encoded points on a map, and to provide results in an efficient manner when requesting to display it on a map.

The gathered data may include route information along with the device records, for example, device identifier, start location of the route, destination location for the route, time of the day for the travel, day of the week for the travel, time taken for or duration of the travel, distance covered during the travel, etc. Thus, over a period of time, the data regarding common routes taken by vehicles, the total travel time taken for each trip, the day of week and starting time of trip may be collected and analyzed. It is therefore possible to rank the trips based on journey time for a set distance and/or the distance covered within a specific period of time. The best time of day and the least time taken for this trip is then be ascertained from the collected data and an automatic geo-fence is created using the gathered data.

The algorithm used by the analytics engine 110 to create an automatic geo-fence may first scan through the device records and choose a set of points from a previous trip along the same route, also called as a discovery process. The points are sampled such that they are as equally spaced as possible. This is done either with respect to time, distance or a combination of distance and time as desired. These sampled coordinates form the control points for a Non-Uniform Rational cubic B-spline (NURB) that approximates the route and a parameterized curve results from the above operation.

Figure 2A:
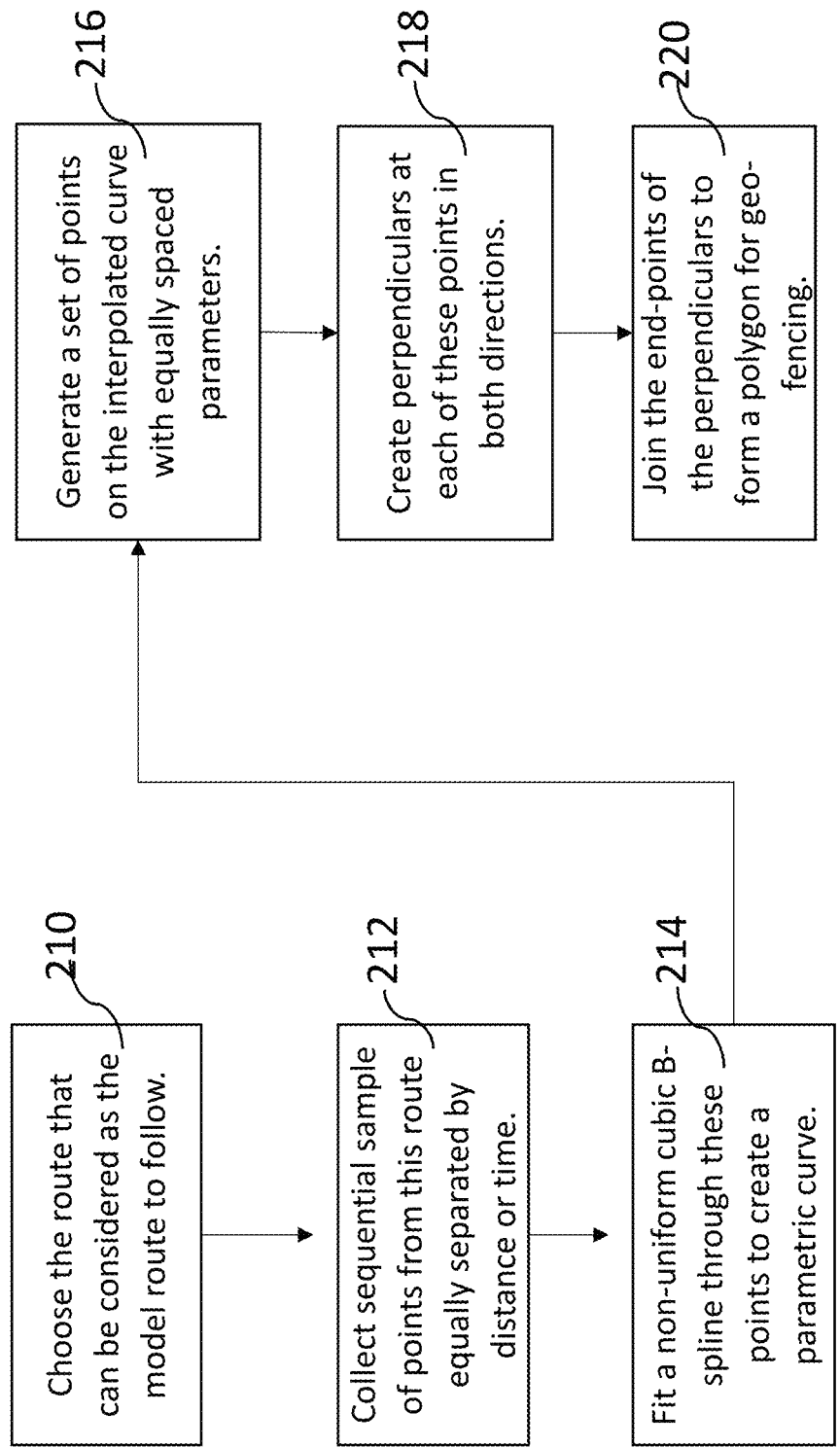
FIG. 2A illustrates an exemplary process for creating a geo-fence according to an embodiment described herein.
Figure 2B:
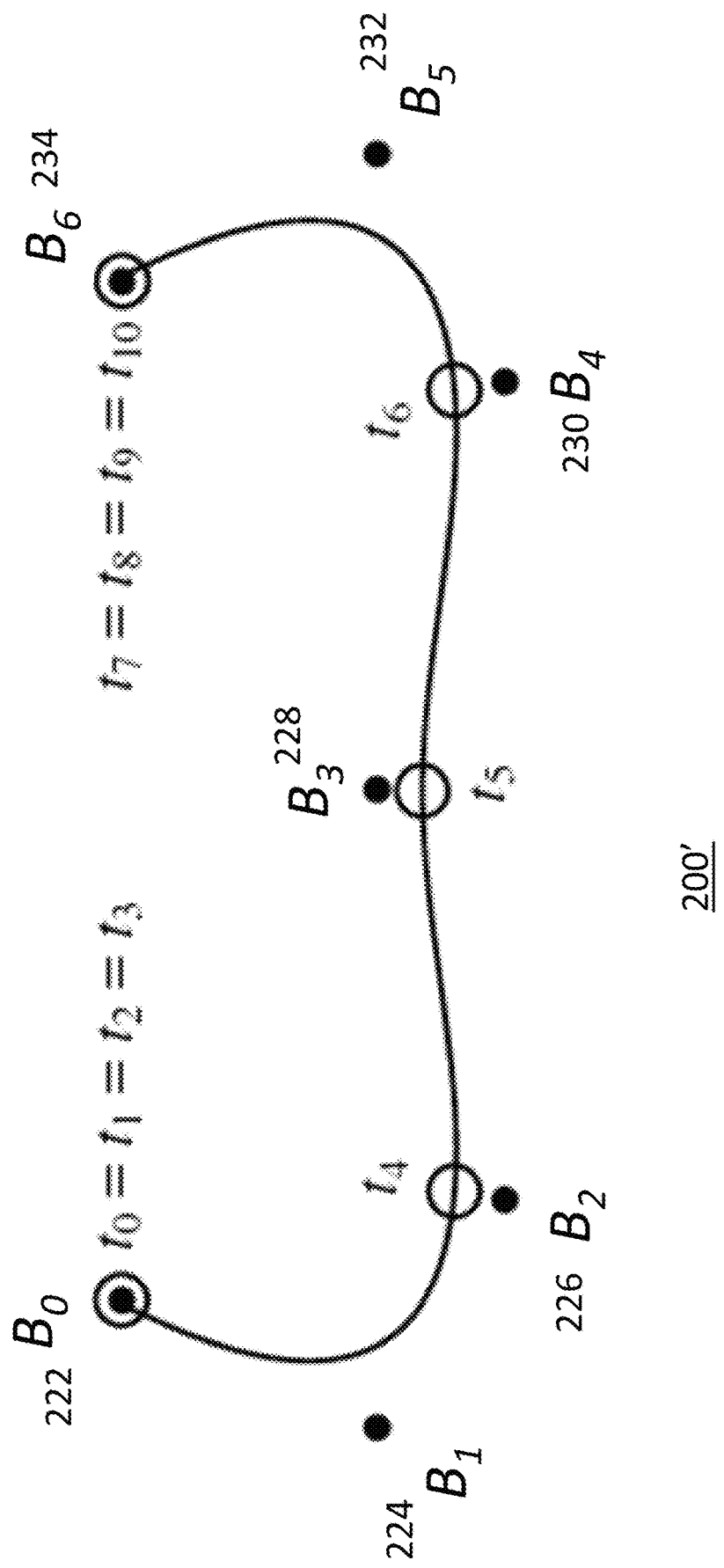
FIG. 2B illustrates an exemplary process for creating a geo-fence according to an embodiment described herein.

The above operation may be considered a mapping of points from Cartesian space to parametric space with parameter 't'. For example, uniformly separated parameterized points ranging from t=0 to t=1 with a predetermined interval, e.g., an interval of 0.01 are then calculated along the curve to act as anchor points for perpendiculars along the curve. The exemplary process is depicted in FIG. 2B and described in detail in the description accompanying FIG. 2B.

Figure 2C:
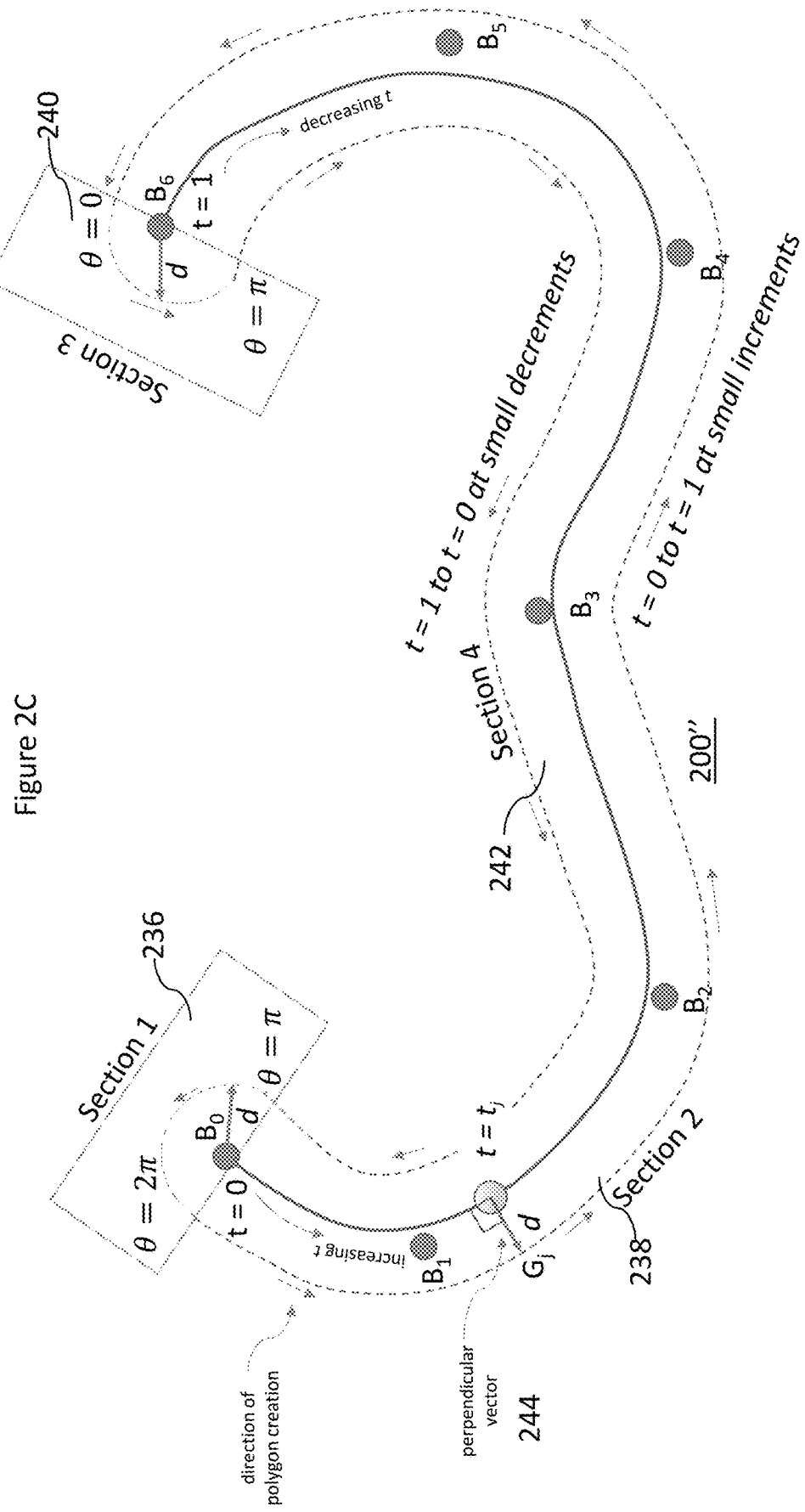
FIG. 2C illustrates an exemplary process for creating a geo-fence according to an embodiment described herein.

In an exemplary embodiment, the polygon geo-fence comprises of four different sections as depicted in FIG. 2C and described in detail in the description accompanying FIG. 2C. Two points along each perpendicular are calculated on either direction which are at a pre-set distance, e.g., 0.25 kilometers, 1 kilometer etc. from the route. The end-points of the perpendiculars are joined sequentially in sequence to create the polygon that becomes the geo-fence created for the route to be monitored. This process of creating a geo-fence using system 100 is illustrated in FIGS. 2A, 2B and 2C and described in detail in the description accompanying FIGS. 2A, 2B and 2C.

The rules engine 112 of the data processing system 102 may determine proximity of the destination location already in the database to the actual and/or entered destination location by using a radius of proximity that may be defined by the user or provided to the system. If actual and/or entered destination location is within the radius of proximity of the destination location already in the database, it is assumed that the actual and/or entered destination location and the destination location already in the database are the same, and that destination location is suggested for the new journey. Otherwise, the actual and/or entered destination location is treated as a new actual destination location and is added to the learning database 108.

The algorithm may be designed to work within the SaaS (Software as a Service) model where one physical database may be maintained for collecting and storing data related to all accounts and that data used on an aggregate basis to assist the rules engine 112 in learning routes and determining optimal time and route for making that journey, but actual data of devices identified to each account is stored in a secure manner and kept separate for each account and processed and displayed exclusively for that account within the database to preserve confidentiality.

The process of discovery may be triggered by using a script that runs at periodic intervals, for example, once a day, once a week etc. An alternate way to trigger the discovery process may be through a streaming API that analyzes a trip as soon as it ends and stores the start and stop-locations for the trip. Alternatively, the discovery process may be defined as an ongoing process, collecting device data in near-real time.

The discovered routes may then be clustered or grouped by the clustering/grouping engine 116 of the data processing system 102 to form bigger groups based on start location and end location. For example, start and end locations for a route detected by the system, within a predefined radius of proximity, e.g., 1 mile, from a known start and end location, may be grouped together as a cluster or group. Several such collections or clusters with different radii of separation—all of which may be derived from the base collection, may be stored in database 108. The trips are then ranked by using different parameters including total travel time taken to complete a trip, distance covered by the trip or a combination thereof and presented to the user via user interface 118.

Figure 3:
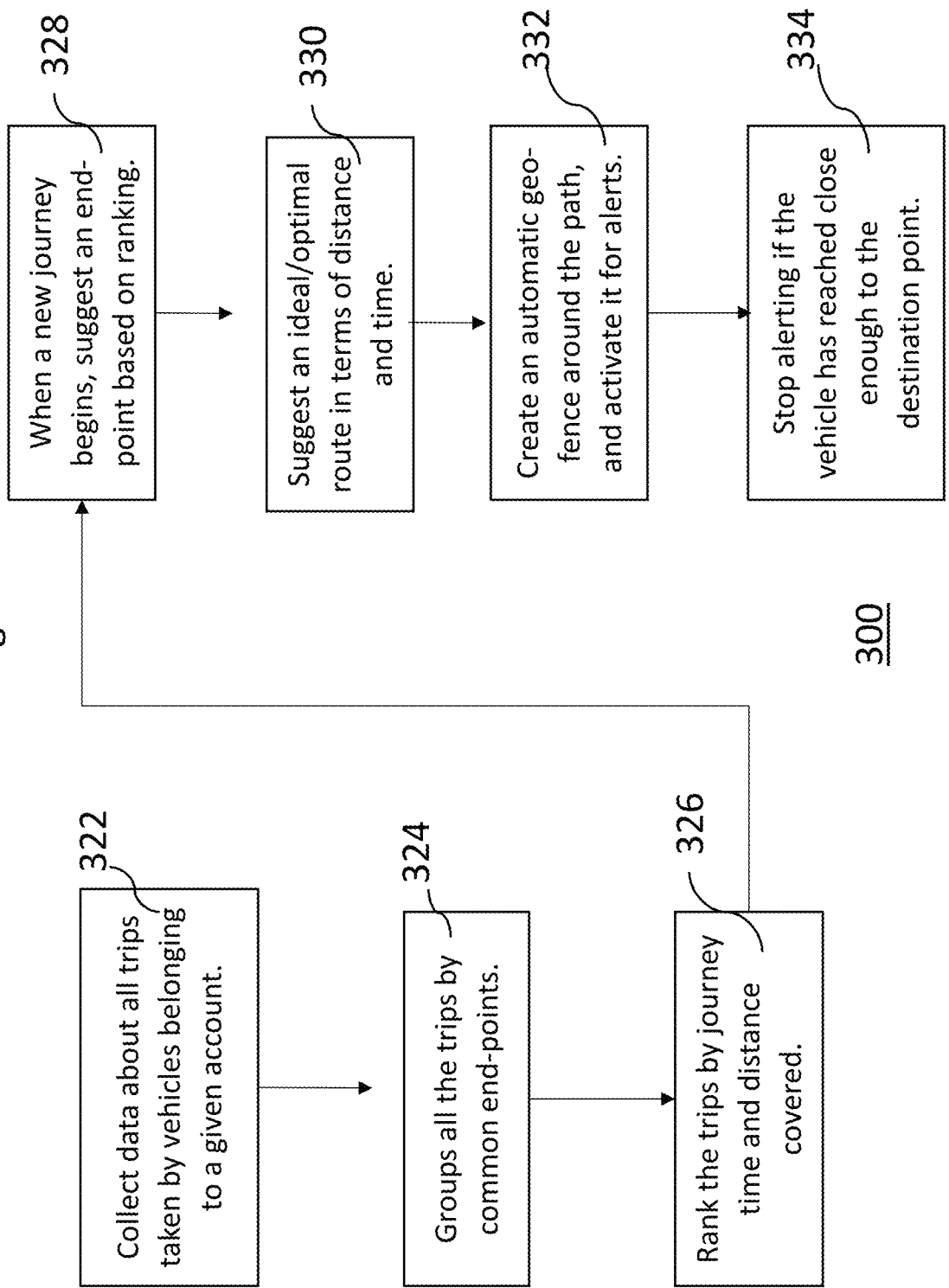
FIG. 3 illustrates an exemplary process for providing the created geo-fence to an application according to an embodiment described herein.

At the onset of a new journey from a known starting point, the user interface may present a list of possible destination locations ranked according to degree of confidence (e.g., number of routes started from that exact location at any time, or number of routes started from that or a nearby location at that time and date) and allows the user to choose one of the suggested destination locations in the graphical user interface 118 as route selection. Once the destination location is selected, the system looks up a list of routes previously taken by vehicles moving between the same end-points, and the best one in terms of time and distance is chosen as the ideal route and/or for a similar day of the week and starting time. Using an algorithm illustrated in FIGS. 2A, 2B and 2C, an automatic polygon is created around the route with a pre-set margin of separation (e.g., allowing a deviation of up to 100 meters in any direction to allow navigating to avoid obstacles). This polygon is set as the geo-fence for this trip and may be used by different applications for creating alerts. For example, if the vehicle moves outside this geo-fence polygon, an alert is sent to the driver and owner of the vehicle to warn them of a possible deviation from the allocated route. Once the vehicle reaches the destination or is close enough to the destination point, the system stops sending alerts. The process for providing the created geo-fence using system 100 is illustrated in FIG. 3.

FIG. 2A illustrates an exemplary process for creating a geo-fence using system 100 according to an embodiment described herein. The computer-implemented method for creating a geo-fence around a route includes collecting and storing route information for one or more mobile devices; analyzing the route information for the one or more mobile devices to determine optimal time and route for making that journey; and creating the geo-fence around a route to be monitored based on the route information for the optimum route. Creating the geo-fence around a route to be monitored further includes choosing a set of points along the route to be monitored; sampling at least two points from the set of points to form a parameterized curve; calculating parameterized points along the parameterized curve to act as anchor points for perpendiculars along the curve; calculating two points along each perpendicular at a predetermined distance from the route on either direction; and joining end points of the perpendiculars sequentially to form a polygon creating the automatic geo-fence for the route to be monitored.

The algorithm to create an automatic geo-fence around a route to be monitored works as follows. First a set of points from a previous trip along the same route is chosen via step 210. This is then sampled such that they are as equally spaced as possible via step 212. This is done either with respect to time, distance or a combination of distance and time as desired. These sampled coordinates form the control points for a non-uniform rational cubic B-spline that approximates the route and a parameterized curve results from the above operation via step 214. Uniformly separated parameterized points are then calculated along the curve via step 216 to act as anchor points for perpendiculars along the curve. Two points along each perpendicular are calculated on either direction which are at a pre-set distance from the route via step 218. Finally, the end-points of the perpendiculars are joined sequentially to create the polygon that becomes the automatic geo-fence for the route via step 220.

For example, once a first a set of points from a previous trip along the same route is chosen via step 210, it is then sampled such that they are as equally spaced as possible via step 212. This is done either with respect to time, distance or a combination of distance and time as desired. These sampled coordinates form the control points for a Non-Uniform Rational cubic B-spline (NURB) that approximates the route and a parameterized curve results from the above operation via step 214. An exemplary curve fitting using cubic B-spline, where $B_1$-$B_6$ are control points and $t_1$-$t_6$ are parameters along the curve is depicted by FIG. 2B and described in detail in the description accompanying FIG. 2B.

Uniformly separated parameterized points are then calculated along the curve via step 216 to act as anchor points for perpendiculars along the curve. Two points along each perpendicular are calculated on either direction which are at a pre-set distance, e.g., 0.25 kilometers, 1 kilometer etc. from the route via step 218. Finally, the end-points of the perpendiculars are joined in sequence to create the polygon via step 220 that becomes the automatic geo-fence created for the route to be monitored. An exemplary process for creating a geofence is depicted by FIG. 2C and described in detail in the description accompanying FIG. 2C.

FIG. 2B illustrates an exemplary curve fitting process using the algorithm illustrated by step 214 in FIG. 2A and described in the description accompanying FIG. 2A. In an exemplary curve fitting using cubic B-spline, $B_1$-$B_6$ (222-234) are control points and $t_1$-$t_6$ are parameters along the curve 200'. FIG. 2B illustrates a simplified scenario for a curve 200' with 7 control points ($B_0$ 222, $B_1$ 224, . . . , $B_6$ 234), the solid line represents a cubic B-spline fitted through these points based on the formula given below. Points along this curve are then calculated based on the parameter 't' which takes equally separated discrete values $t_0$, $t_1$, $t_2$, . . . , $t_{10}$.

This B spline curve 200' is defined by the equation:

$$Q(t) = \frac{\sum_{i=1}^{n} w_i B_i N_{i,k}(t)}{\sum_{i=1}^{n} w_i N_{i,k}(t)}$$

where $w_i$=scalar weight for each control point, $B_i$=control points, $N_{i,k}(t)$=the B-Spline curve and k=B-spline parameter. The curve defined by $Q_{(t)}$ is a B-spline. Since a cubic B-spline is used in this implementation, k is equal to 3 and weight $w_i$ is equal to 1. The curve defined by $Q_{(t)}$ is a B-spline. Since a cubic B-spline is used in this implementation, k or order of the curve, is equal to 3 and weight $w_i$ is equal to 1. Another parameter along the curve is t, where $t_i \in [0,1]$ in increments, for example, 0.01. Device location points are used as control points $B_0, B_1, \ldots, B_n$, with degree of separation p≡m−n−1.

An exemplary curve fitting using cubic B-spline, where B-spline, where $B_1$-$B_6$ (222-234) are control points and $t_1$-$t_6$ are parameters along the curve is described herein. The curve defining B-spline 200' can be calculated as follows:

The basis function is defined as:

$$N_{i,0}(t) = \begin{cases} 1 & \text{if } t_i \leq t < t_{i+1} \text{ and } t_i < t_{i+1} \\ 0 & \text{otherwise} \end{cases}$$

-continued $$N_{i,j}(t) = \frac{t - t_i}{t_{i+j} - t_i} N_{i,j-1}(t) + \frac{t_{i+j+1} - t}{t_{i+j+1} - t_i} N_{i+1,j-1}(t)$$

where j=1, 2, . . . , k; and the curve B-spline is defined as:

$$Q(t) = \sum_{i=1}^{n} B_i N_{i,k}(t)$$

The above operation may be considered a mapping of points from Cartesian space to parametric space with parameter 't'. For example, uniformly separated parameterized points ranging from t=0 to t=1 with a predetermined interval, e.g., an interval of 0.01 are then calculated along the curve to act as anchor points for perpendiculars along the curve.

FIG. 2C shows the same simplified scenario as FIG. 2B and illustrates how the geo-fence is created around the B-spline using the algorithm illustrated by steps 216, 218 and 220 in FIG. 2A and described in the description accompanying FIG. 2A. The geo-fence is divided into four parts: (i) Section 1 236: Semi-circular section of radius 'd' around point $B_0$, (ii) Section 2 238: A curve hugging the B-Spline on the right side at a distance 'd', (iii) Section 3 240: A semi-circle of radius 'd' around the last control point $B_6$ (in this case) and (iv) Section 4 242: A curve hugging the B-Spline on the left side at a distance of 'd'. The detailed description of how these curves are created is described below.

The polygon geo-fence comprises of four different sections as depicted in FIG. 2C. As shown by step 216 of FIG. 2A, uniformly separated parameterized points are then calculated along the curve to act as anchor points for perpendiculars along the curve as follows. Section 1 236 is a semi-circle calculated with a value of $\theta=\pi$ to $\theta=2\pi$ with a radius of the separation d from the route (e.g. 0.25 kilometers, 1 kilometer) and with increment angle $\Delta\theta$ of (e.g.) 5 degrees.

As illustrated by step 218 of FIG. 2A, two points along each perpendicular are calculated on either direction which are at a pre-set distance, e.g., 0.25 kilometers, 1 kilometer etc. from the route as follows. Section 2 238 of the geo-fence is a curve along the right side of the parametric route starting from $t_j=0$ to $t_j=1$ at equal increments of $\Delta t$ (e.g. 0.01). At each $t_j$ a perpendicular vector is constructed with respect to the direction of movement of t and a point $G_j$ at a distance of d is created. Section 3 240 is again a semi-circle with $\theta=0$ to $\theta=\pi$ with same radius of the separation d from the route and with increment angle $\Delta\theta$ of (e.g.) 5 degrees. Section 4 242 of the geo-fence is a curve along the right side of the parametric route starting from $t_j=1$ to $t_j=0$ at equal decrements of $\Delta t$ (e.g. 0.01). At each $t_j$ a perpendicular vector 244 is constructed with respect to the direction of movement of t and a point $G_j$ at a distance of d is created. This point happens to lie on the other side of the curve since the direction of movement is reversed from Section 2 238.

As illustrated by step 220 of FIG. 2A, the end-points of the perpendiculars are joined in sequence to create the polygon that becomes the automatic geo-fence created for the route to be monitored. Joining all the points sequentially from Section 1 236, Section 2 238, Section 3 240 and Section 4 242 gives rise to the complete geo-fence polygon created for the route to be monitored.

FIG. 3 illustrates an exemplary process for providing the geo-fence created as illustrated in FIGS. 2A, 2B and 2C to an application according to an embodiment described herein. The analytics system collects data about all trips taken by vehicles belonging to a given account via step 322. The collected data is grouped by common end-points for trips for which the data is collected via step 324. The trips are the ranked by using different parameters including time taken to complete a trip, distance covered by a trip or a combination thereof via step 326.

At the onset of a new journey from a known starting point, the user interface may present a list of possible destination locations ranked according to degree of confidence (e.g., number of routes started from that exact location at any time, or number of routes started from that or a nearby location at that time and date) via step 328 and allows the user to choose one of the suggested destination locations in the graphical user interface via step 330 as route selection. Once the destination location is selected, the system looks up a list of routes previously taken by vehicles moving between the same end-points, and the best one in terms of time and distance and/or for a similar day of the week and starting time is chosen as the ideal route via step 330. Using an algorithm illustrated in FIGS. 2A and 2B, an automatic polygon is created around the route with a pre-set margin of separation (e.g., allowing a deviation of up to 100 meters in any direction to allow navigating to avoid obstacles) via step 332. This polygon is set as the geo-fence for this trip. If the vehicle moves outside this geo-fence polygon, an alert is sent to the driver and owner of the vehicle to warn them of a possible deviation from the allocated route. Once the vehicle reaches the destination or is close enough to the destination point, the system stops sending alerts via step 334.

Figure 4:
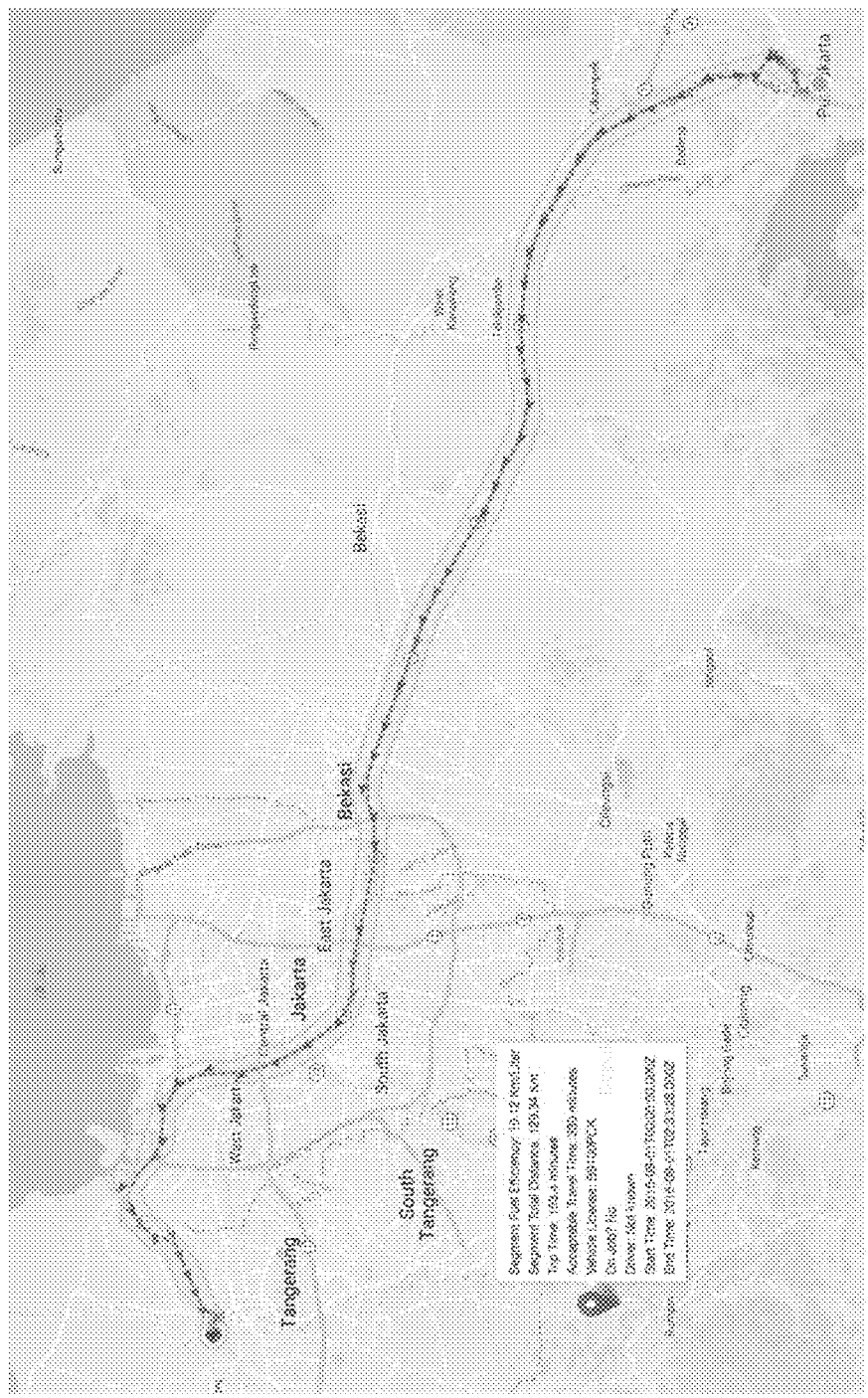
FIG. 4 is a diagram illustrating a discovered route with a geo-fence polygon around it according to an embodiment of the present invention.

FIG. 4 is a diagram illustrating an exemplary user interface for viewing a discovered route with a geo-fence polygon around it according to an embodiment of the present invention. FIG. 4 illustrates an exemplary screen shot 400 showing a discovered segment including any one or more parameters such as fuel efficiency for that segment, total distance of the segment, time taken to travel that segment, acceptable travel time for that segment derived from data analysis of other trips on that segment, other information related to the device, start time and end time of the journey etc. The route shown herein has been broken into predetermined or desired number parts, e.g., 1000 parts, along the parameter t that traverses along the length of the route, with perpendiculars plotted with a pre-set margin, e.g., a margin of 1 Km away from route shown as the shaded region around the path.

Figure 5:
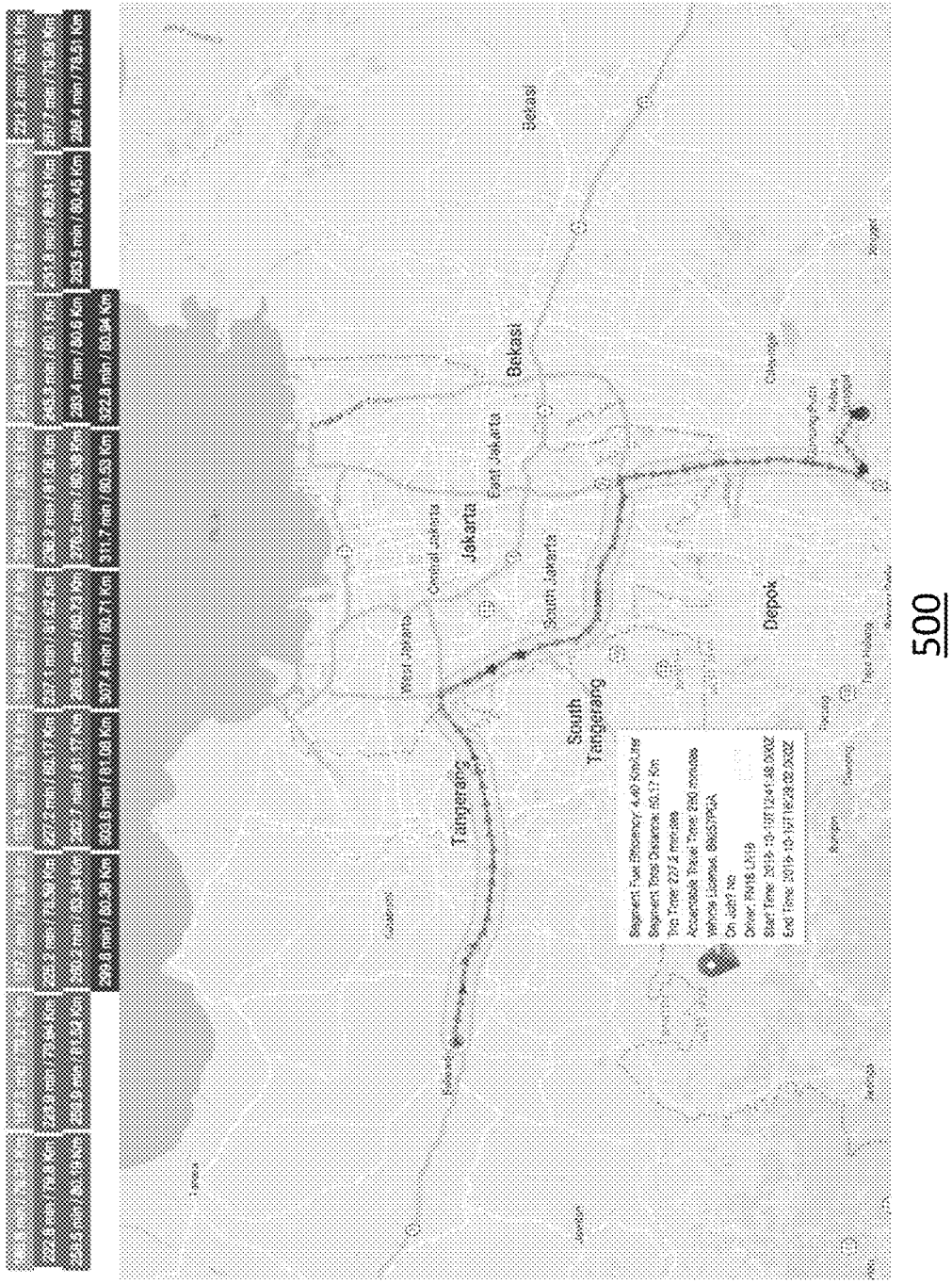
FIG. 5 is a diagram illustrating a set of routes between two locations, and a suggestion of the most optimal route with a calculated geo-fence around it according to an embodiment of the present invention.

FIG. 5 is a diagram illustrating a set of routes between two locations, and a suggestion of the most optimal route with a calculated geo-fence around it according to an embodiment of the present invention. FIG. 5 illustrates an exemplary screen shot 500 showing a set of routes between two locations, and a suggestion of the most optimal route with a calculated geo-fence around it. For example, as shown in FIG. 5, the data may be sorted based on parameters such as time taken to travel a particular route, ranked in order from fastest to slowest. The other parameters that may be displayed may include any one or more of: the time of day when the journey started, the day of week when the journey took place etc. Thus, over a period of time, the data regarding common routes taken by vehicles, e.g., the total travel time taken for each trip, and the day of week and starting time of trip may be collected and analyzed. It is therefore possible to rank the trips based on journey time for a set distance and/or the distance covered within a specific period of time. The best time of day and the least time taken for this trip may then be ascertained from the collected data and may be used for planning future trips.

Figure 6:
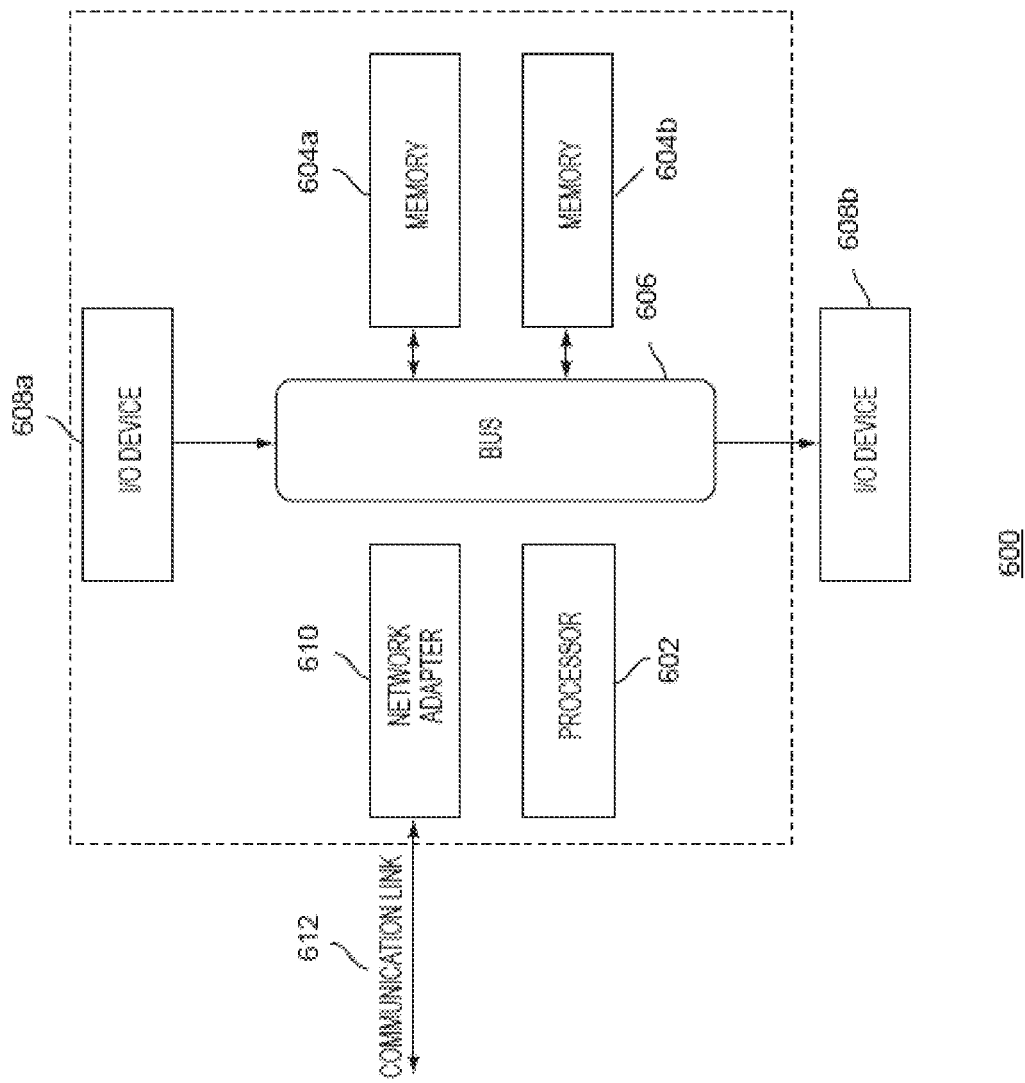
FIG. 6 illustrates a data processing system 600 suitable for storing the computer program product and/or executing program code relating to providing a geo-fence around a route for IoT devices in accordance with an embodiment described herein.

FIG. 6 illustrates a data processing system 600, suitable for storing the computer program product and/or executing program code relating to providing a geo-fence around a route for IoT devices in accordance with an embodiment described herein.

In an example embodiment, a non-transitory computer-readable medium is disclosed. The computer readable medium includes executable instructions stored therein that, when executed, cause one or more processors corresponding to a system for providing a geo-fence, the system including one or more mobile devices, a user interface and a data processing system having a learning database to perform operations including collecting and storing route information for one or more mobile devices by a learning database; analyzing the route information for the one or more mobile devices to determine optimum route, and creating the geo-fence around a route to be monitored based on the route information for the optimum route by the analytics engine.

The data processing system 600 includes a processor 602 coupled to memory elements 604a-b through a system bus 606. In other embodiments, the data processing system 600 may include more than one processor and each processor may be coupled directly or indirectly to one or more memory elements through a system bus.

Memory elements 604a-b can include local memory employed during actual execution of the program code, bulk storage, and cache memories that provide temporary storage of at least some program code in order to reduce the number of times the code must be retrieved from bulk storage during execution. As shown, input/output or I/O devices 608a-b (including, but not limited to, keyboards, displays, pointing devices, etc.) are coupled to the data processing system 600. I/O devices 608a-b may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application or similar while the primary software and data are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "communications network" includes communications across a network (such as that of a M2M but not limited thereto) using one or more communication architectures, methods, and networks including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WLAN) or Bluetooth and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for providing a geo-fence, the method comprising:
    collecting and storing route information for one or more mobile devices;
    analyzing the route information for the one or more mobile devices to determine optimum route; and
    creating the geo-fence around a route to be monitored based on the route information for the optimum route,
        wherein creating the geo-fence around a route to be monitored comprises:
            choosing a set of points along the route to be monitored;
            sampling at least two points from the set of points to form a parameterized curve;
            calculating parameterized points along the parameterized curve to act as anchor points for perpendiculars along the curve;
            calculating two points along each perpendicular at a predetermined distance from the route on either direction; and
            joining end points of the perpendiculars to form a polygon to create the geo-fence for the route to be monitored.

2. The computer-implemented method of claim 1, wherein the route information for one or more mobile devices comprises one or more of: start location of the route, destination location for the route, time of the day for the travel, day of the week for the travel, duration of the travel, and distance covered during the travel.

3. The computer-implemented method of claim 1, wherein analyzing the route information to determine optimum route comprises:
    grouping the collected data by common end-points for the routes for which the data is collected,
    ranking the routes according to distance covered and time taken for the journey, and
    determining the optimum route based on the ranking.

4. The computer-implemented method of claim 3, wherein analyzing the route information to determine optimum route further comprises determining the optimum route based on at least one of: time of the day for the travel, day of the week for the travel and a combination thereof.

5. The computer-implemented method of claim 1, wherein sampling at least two points from the set of points to form a parameterized curve comprises sampling at least two points that are equally spaced in terms of one or more of: time travelled, distance travelled and a combination thereof.

6. The computer-implemented method of claim 1, wherein the parameterized points along the parameterized curve are uniformly separated.

7. A system for providing a geo-fence, the system comprising one or more mobile devices, a user interface and a data processing system, wherein the data processing system further comprises:
    a learning database, wherein the learning database collects and stores route information for the one or more mobile device; and
    an analytics engine, wherein the analytics engine
        analyzes the route information of the one or more mobile devices to determine optimum route, and
        creates the geofence around a route to be monitored based on the route information for the optimum route,
        wherein creating the geo-fence around a route to be monitored comprises:
            choosing a set of points along the route to be monitored;
            sampling at least two points from the set of points to form a parameterized curve;
            calculating parameterized points along the parameterized curve to act as anchor points for perpendiculars along the curve;
            calculating two points along each perpendicular at a predetermined distance from the route on either direction; and
            joining end points of the perpendiculars to form a polygon to create the geo-fence for the route to be monitored.

8. The system of claim 7, wherein the route information for one or more mobile devices comprises one or more of: start location of the route, destination location for the route, time of the day for the travel, day of the week for the travel, duration of the travel, and distance covered during the travel.

9. The system of claim 7, wherein analyzing the route information to determine optimum route comprises:
    grouping the collected data by common end-points for the routes for which the data is collected,
    ranking the routes according to distance covered and time taken for the journey, and
    determining the optimum route based on the ranking.

10. The system of claim 9, wherein analyzing the route information to determine optimum route further comprises determining the optimum route based on at least one of: time of the day for the travel, day of the week for the travel and a combination thereof.

11. The system of claim 7, wherein sampling at least two points from the set of points to form a parameterized curve comprises sampling at least two points that are equally spaced in terms of one or more of: time travelled and distance travelled.

12. The system of claim 7, wherein the parameterized points along the parameterized curve are uniformly separated.

13. A non-transitory computer-readable medium having executable instructions stored therein that, when executed, cause one or more processors corresponding to a system for providing a geo-fence, the system comprising on or more mobile devices, a user interface and a data processing system including a learning database and an analytics engine, to perform operations comprising:
    collecting and storing route information for one or more mobile devices by the learning database;
    analyzing the route information for the one or more mobile devices to determine optimum route, and
    creating the geo-fence around a route to be monitored based on the route information for the optimum route by the analytics engine, wherein creating the geo-fence around a route to be monitored comprises:
        choosing a set of points along the route to be monitored;

sampling at least two points from the set of points to form a parameterized curve;

calculating parameterized points along the parameterized curve to act as anchor points for perpendiculars along the curve;

calculating two points along each perpendicular at a predetermined distance from the route on either direction; and joining end points of the perpendiculars to form a polygon to create the automatic geo-fence for the route to be monitored.

14. The non-transitory computer-readable medium of claim 13, wherein the route information for one or more mobile devices comprises one or more of: start location of the route, destination location for the route, time of the day for the travel, day of the week for the travel, duration of the travel, and distance covered during the travel.

15. The non-transitory computer-readable medium of claim 13, wherein analyzing the route information to determine optimum route comprises:

grouping the collected data by common end-points for the routes for which the data is collected, ranking the routes according to distance covered and time taken for the journey, and determining the optimum route based on the ranking.

16. The non-transitory computer-readable medium of claim 15, wherein analyzing the route information to determine optimum route further comprises determining the optimum route based on at least one of: time of the day for the travel, day of the week for the travel and a combination thereof.

17. The non-transitory computer-readable medium of claim 13, wherein sampling at least two points from the set of points to form a parameterized curve comprises sampling at least two points that are equally spaced in terms of one or more of: time travelled and distance travelled.

18. The non-transitory computer-readable medium of claim 13, wherein the parameterized points along the parameterized curve are uniformly separated.

* * * * *